United States Patent Office 3,474,111
Patented Oct. 21, 1969

3,474,111
γ-ETHYL-α-METHYL-Δ$^{α,β}$-BUTENOLIDE
George Suld, Delaware, Pa., assignor to Sun Oil Company, Philadelphia, Pa., a corporation of New Jersey
No Drawing. Filed June 30, 1966, Ser. No. 562,955
Int. Cl. C07d 5/06; C11d 7/50; A01n 9/28
U.S. Cl. 260—343.6                    10 Claims

ABSTRACT OF THE DISCLOSURE

This invention relates to a novel unsaturated γ-lactone or butenolide, namely, γ-ethyl-α-methyl-Δ$^{α,β}$-butenolide, and to its preparation by pyrolysis of either the cis-cis or cis-trans form of α,α'-dimethylmuconic acid (referred to herein as DMMA). The novel product of the pyrolysis reaction has the structural formula

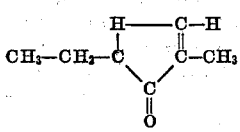

and is a substantially colorless oil useful in various applications.

Background

The unsaturated diacid, α,α'-dimethylmuconic acid, can exist in three isomeric forms, viz. cis-cis, trans-trans and cis-trans, which can be depicted by the following structural formulas:

cis-cis

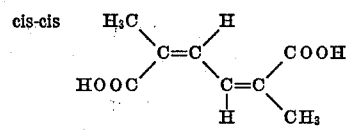

trans-trans

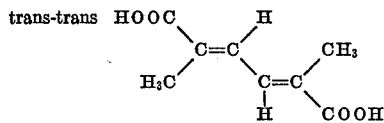

cis-trans

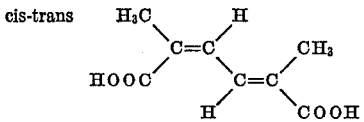

The preparation of each of these isomeric forms has been described in the prior art by Elvidge et al., J. Chem. Soc., pages 1026–1033 (1952).

A comprehensive review of the prior art on preparation of butenolides has been given by Rao in Chem. Rev., 64, 353–388 (1964). This reference includes a tabulation showing that numerous butenolides have been made utilizing various methods but not by pyrolysis of a muconic acid derivative.

It has been reported by Elvidge et al., J. Chem. Soc., pages 2228–2235 (1950), that when muconic acid itself was heated to 200° C., a dilactone resulted which was, specifically, γ,γ'-dilactone - 3,7 - diketo - 2,6 - dioxabicyclo[3,3,0]octane. This reaction did not involve decarboxylation.

Description of the invention

It has now been discovered that when α,α'-dimethylmuconic acid (DMMA) of either the cis-cis or cis-trans form is heated above its melting point, an unexpected reaction occurs to yield γ-ethyl-α-methyl-Δ$^{α,β}$-butenolide as the main product. This product is a substantially colorless oil.

The reaction is illustrated by the following equation:

(cis-cis or cis-trans DMMA)
COOH·CCH$_3$:CH·CH:CCH$_3$·COOH $\xrightarrow{\Delta}$

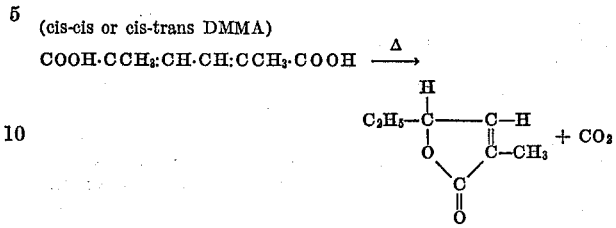

This reaction involves decarboxylation of one of the carboxyl groups with a concurrent shift of hydrogen from each of the original carboxyl groups to the carbon atom adjacent to the carboxyl group that disappears and lactonization between the remaining carboxyl group and the gamma carbon atom. The reaction occurs in substantially the same way for either the cis-cis or the cis-trans isomer of DMMA. On the other hand, when the trans-trans DMMA isomer is heated in the same fashion, substantially no reaction is obtained. Consequently, for practicing the invention, the starting DMMA must have at least one cis double bond configuration.

The pyrolysis is carried out by heating the DMMA charge to a temperature between its melting point and 280° C., preferably below 260° C., and removing from the reaction zone γ-ethyl-α-methyl-Δ$^{α,β}$-butenolide as the pyrolysis reaction occurs. Removal of the product is best done by sweeping the pyrolysis zone with a stream of inert gas in order to carry out this butenolide product as it forms. Examples of suitable inert gases are nitrogen, carbon dioxide, helium and hydrogen. Neither air nor steam is suitable for this purpose, as air would tend to oxidize the material and steam would tend to hydrolyze the desired lactone product.

The use of an inert sweep gas while maintaining the pyrolysis temperature as above specified permits maximization of yield of the ethyl-substituted butenolide in accordance with the foregoing equation. These conditions allow decarboxylation of one carboxyl group and lactonization of the other to occur, while then resulting in removal of the butenolide product from the pyrolysis zone before substantial decomposition thereof can occur. In contrast, when too high a temperature is used or when the pyrolysis is done under reduced pressure without a sweep gas, a substantial amount of lactonized but non-decarboxylated product is driven off, such product being α-methyl-γ-(1-carboxyethyl)-Δ$^{α,β}$ - butenolide. Also, when conditions are such as to allow the desired butenolide to remain in the pyrolysis zone too long, decomposition thereof to other products not identified can occur.

The minimum temperature for the pyrolysis is just above the melting point of the DMMA charge and cannot be specified precisely since it can very substantially depending upon purity of the material and the melting point determination procedure employed. Typical melting points (capillary method) for relatively pure DMMA material are 223–224° C. for the cis-cis isomer and 179–180° C. for the cis-trans isomer. Preferably the pyrolysis temperature used is substantially above these values, for example, 230–250° C. for either isomer. In either case the temperature should not exceed 280° C. and desirably is held below 260° C.

The butenolide product can be recovered from the sweep gas effluent from the reaction zone by passing the effluent through a refrigerated condenser and liquefying the product. The product, after cohobation, is a substantially colorless oil. If desired, the carrier gas can be recycled to the pyrolysis zone since the carbon dioxide resulting from the reaction would not be detrimental.

The invention is specifically illustrated by the following example:

Example

The charge was 20.0 g. (0.118 mole) of cis-cis-$\alpha,\alpha'$-dimethylmuconic acid. This was placed in a 100 ml. flask provided with a gas inlet tube and immersed in an oil bath which was heated to 225° C. At this temperature a melt of the cis-cis DMMA was obtained. A slow stream of nitrogen (40 ml./min.) was fed througn the tube throughout the pyrolysis, and the effluent from the flask was passed into an ice cooled condenser and receiver. The temperature of the melt was maintained at 225–235° C. and product was collected in the receiver over a 3-hour period. A total of 12 g. (12 ml.) of slightly discolored non-acidic oil with a characteristic odor was obtained. This corresponded to a yield of 81% of the theoretical value. VPC analysis indicated that the product was preponderantly (>95%) one component. Distillation at reduced pressure gave a colorless oil, B.P. 78° C. at 4 mm. Hg abs., $n_D^{20}$ 1.4588. Analysis of this product by UV, IR and NMR spectroscopy indicated that the product was $\gamma$-ethyl-$\alpha$-methyl-$\Delta^{\alpha,\beta}$-butenolide. Elemental analysis and molecular weight determinations, compared with the theoretical values for $C_7H_{10}O_2$, were as follows:

|  | Determined | Theoretical |
| --- | --- | --- |
| Percent C | 65.3 | 66.6 |
| Percent H | 8.1 | 7.95 |
| Mol. wt. (by mass spec.) | 126 | 126 |

The foregoing example shows that the unsaturated $\gamma$-lactone can readily be prepared in high yield from cis-cis DMMA under pyrolysis conditions as herein described. When cis-trans form of DMMA is substituted for the cis-cis isomer, substantially analogous results are obtained. In contrast, when trans-trans DMMA is substituted, substantially no reaction occurs.

The unsaturated $\gamma$-lactone product of the invention is useful for various applications. One area of applicability is as a gasoline additive for inhibiting carburetor and engine deposits and as a component for carburetor and engine cleaner compositions. Another is as a plasticizer for polyvinyl chloride compositions. The product can also be employed as a monomer for making polyesters by esterification with alcohols using a catalyst such as MgO or ZnO, or as a comonomer for copolymerization with styrene or other vinyl monomers by free radical catalysis.

The product additionally has activity for various pesticidal purposes and can be utilized as a fungicide.

I claim:
1. Method for preparing $\gamma$-ethyl-$\alpha$-methyl-$\Delta^{\alpha,\beta}$-butenolide which comprises pyrolyzing $\alpha,\alpha'$-dimethylmuconic acid of the cis-cis or cis-trans form at a temperature between its melting point and 280° C. and removing from the pyrolysis zone $\gamma$-ethyl-$\alpha$-methyl-$\Delta^{\alpha,\beta}$-butenolide as the pyrolysis reaction occurs.
2. Method according to claim 1 wherein the cis-cis form of said acid is used.
3. Method according to claim 2 wherein the pyrolysis temperature is maintained below 260° C.
4. Method according to claim 1 wherein the cis-trans form of said acid is used.
5. Method according to claim 4 wherein the pyrolysis temperature is maintained below 260° C.
6. Method according to claim 1 wherein removal of said butenolide is effected by sweeping the pyrolysis zone with an inert gas.
7. Method according to claim 6 wherein the pyrolysis temperature is maintained below 260° C.
8. Method according to claim 7 wherein the cis-cis form of said acid is used.
9. Method according to claim 7 wherein the cis-trans form of said acid is used.
10. $\gamma$-ethyl-$\alpha$-methyl-$\Delta^{\alpha,\beta}$-butenolide.

References Cited

FOREIGN PATENTS

37/16,263  10/1962  Japan.

OTHER REFERENCES

Armengaud, C. R., 254, 3696–3698.
Dickens et al., Chem. Abstracts 55, 21,347g (1961), as abstracted from Brit. J. Cancer 15, 85–100 (1961).
Elvidge et al., J. Chem. Soc. (1950), pp. 2228 and 2229.
Jones et al., J. Chem. Soc. (1957), pp. 4628–4631.
Kuehl et al., J. Chem. Soc. (1950), pp. 2213–2217.

ALEX MAZEL, Primary Examiner

J. A. NARCAVAGE, Assistant Examiner

U.S. Cl. X.R.

252—170; 260—33.8, 86.7; 424—279